US007786369B2

(12) United States Patent
Eom et al.

(10) Patent No.: US 7,786,369 B2
(45) Date of Patent: Aug. 31, 2010

(54) SYSTEM FOR PLAYING MUSIC AND METHOD THEREOF

(75) Inventors: Ki Wan Eom, Suwon-si (KR); Hyoung Gook Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 311 days.

(21) Appl. No.: 11/889,663

(22) Filed: Aug. 15, 2007

(65) Prior Publication Data

US 2008/0190269 A1 Aug. 14, 2008

(30) Foreign Application Priority Data

Feb. 12, 2007 (KR) ...................... 10-2007-0014543

(51) Int. Cl.
*G06F 17/00* (2006.01)
*G10H 7/00* (2006.01)
*G10H 1/22* (2006.01)

(52) U.S. Cl. .............................. 84/618; 84/604; 700/94

(58) Field of Classification Search ........... 84/600–602, 84/611, 622, 604, 618; 700/94
See application file for complete search history.

(56) References Cited

U.S. PATENT DOCUMENTS

| | | | | |
|---|---|---|---|---|
| 2005/0211071 | A1 * | 9/2005 | Lu et al. | 84/611 |
| 2007/0107584 | A1 | 5/2007 | Kim et al. | |
| 2007/0174274 | A1 | 7/2007 | Kim et al. | |
| 2007/0208990 | A1 | 9/2007 | Kim et al. | |

FOREIGN PATENT DOCUMENTS

| | | |
|---|---|---|
| JP | 2004-219804 | 8/2004 |
| KR | 10-2003-0067377 | 8/2003 |
| KR | 2004-219804 | 8/2004 |
| KR | 10-2006-0091063 | 8/2006 |
| KR | 10-0764346 | 9/2007 |

OTHER PUBLICATIONS

Pye, D. (2000), Content-based methods for the management of digital music, in 'ICASSP '00: Proceedings of the Acoustics, Speech, and Signal Processing, 2000. On IEEE International Conference', IEEE Computer Society, Washington, DC, USA , pp. 2437-2440.*
Decision to Grant dated Jul. 31, 2008 in corresponding Korean Patent Application No. 10-2007-0014543 (1 pg).
Office Action dated Mar. 14, 2008 in corresponding Korean Patent Application No. 10-2007-0014543 (4 pages).
Pfeiffer et al., "Formalisation of MPEG-1 compressed domain audio features", CSIRO Mathematical and Information Sciences, Dec. 18, 2001, pp. 1-18 (in English).
Text of article found at http://biblioteca.universia.net/ficha.do?id=5803413, Compressed Domain Processing of MPEG Audio, Anantharaman, B. (in English), 2001.

* cited by examiner

*Primary Examiner*—Jeffrey Donels
*Assistant Examiner*—Andrew R Millikin
(74) *Attorney, Agent, or Firm*—Staas & Halsey LLP

(57) ABSTRACT

A system for playing music is provided. The system includes: a mood categorizer categorizing a mood of a music file; a similar music search module searching for similar music having a mood similar to music which a user desires by referring to the categorized mood; a highlight detector detecting a highlight section of the music file; and a theme categorizer categorizing a theme of the music file.

12 Claims, 12 Drawing Sheets

SYSTEM FOR PLAYING MUSIC AND METHOD THEREOF

CROSS-REFERENCE TO RELATED APPLICATION

This application claims the benefit of Korean Patent Application No. 10-2007-0014543, filed on Feb. 12, 2007, in the Korean Intellectual Property Office, the disclosure of which is incorporated herein by reference.

BACKGROUND OF THE INVENTION

1. Field of the Invention

The present invention relates to a system and method of playing music, and more particularly, to a system and method of playing music which can provide a function of categorizing a mood of a music file, detecting a highlight of the music file, searching for similar music to the music file, and categorizing a theme of the music file.

2. Description of Related Art

Currently, playing music is executed in various apparatuses such as conventional audio playing devices, personal computers (PCs), cellular phones, Moving Picture Experts Group Audio Layer 3 (MP3) players, portable multimedia players (PMPs), and the like. Since music becomes the most important content from multimedia contents which a user generally uses, a function of playing music is generally provided in the conventional audio playing devices and various individual portable terminals.

However, a method of playing a music file, which is stored in a storage apparatus of a system for playing music, depending on a method of selecting/listening to music, in a file name sequence, or a method of playing music in a predetermined sequence, or a method of categorizing and playing music by text information such as an ID3 tag, and playing music, is representative in the conventional method of playing music when the user intends to listen to music. Specifically, the conventional methods of playing music are a successive playing method, a random playing method, and a playing method for each singer and each genre by the ID3 tag.

As described above, the user may feel burdened when the user intends to search for music which the user desires, and play music according to the simple conventional method of selecting/listening to and playing music. As an example, when the user is exercising, it is difficult for the user to separately search for the stored music files, select, and play music which the user desires, in order to listen to suitable music for exercising from among the music files stored in the storage apparatus of the system for playing music.

A function of enabling a user to select and listen to music suitable for a mood depending on a situation by using a music mood is currently added as a method of solving a problem of the conventional method of playing music. However, the conventional method of categorizing a music mood has a drawback in that a processing speed is slow due to a process in a non-compression zone. Since the user's response to recommendation music is required dozens of times in order to improve the user's satisfaction measurement, in the method of searching for a similar music, the user still feels burdened.

Therefore, a system and method of playing music, which can provide a function of categorizing a mood of a music file, detecting a highlight of the music file, searching for similar music to the music file, and categorizing a theme of the music file is required.

BRIEF SUMMARY

An aspect of the present invention provides a system and method of playing music, which can provide a function of categorizing a mood of a music file, detecting a highlight of the music file, searching for similar music to the music file, and categorizing a theme of the music file.

An aspect of the present invention also provides a system and method of playing music, which can selectively play music suitable for a user's situation.

An aspect of the present invention also provides a system and method of playing music, which can perform a high-speed process in a compression zone since a music file is processed by a dual structure of a compression zone and a non-compression zone, and perform a process in various music file formats due to a non-compression zone process.

According to an aspect of the present invention, there is provided a system for playing music, the system including: a mood categorizer categorizing a mood of a music file; a similar music search module searching for similar music having a mood similar to music which a user desires by referring to the categorized mood; a highlight detector detecting a highlight section of the music file; and a theme categorizer categorizing a theme of the music file.

According to another aspect of the present invention, there is provided a method of playing music, the method including: categorizing a mood of a music file; searching for music similar to the music file, based on the mood; detecting a highlight section of the music file; and categorizing a theme of the music file.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
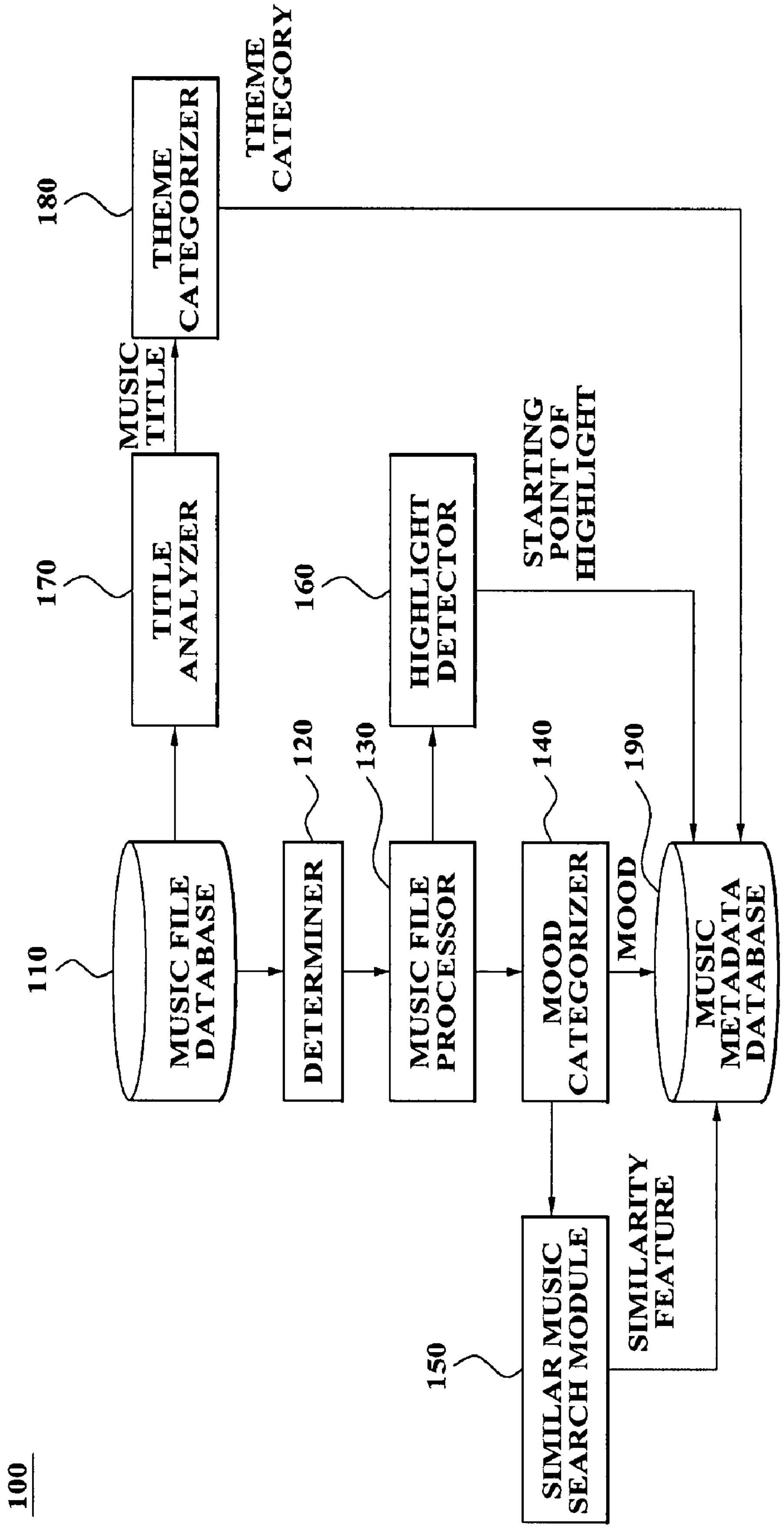
FIG. 1 is a diagram illustrating a configuration of a system for playing music according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a system for playing music according to an exemplary embodiment of the present invention.

Referring to FIG. 1, the system for playing music 100 according to the present exemplary embodiment of the present invention includes a music file database 110, a determiner 120, a music file processor 130, a mood categorizer 140, a similar music search module 150, a highlight detector 160, a title analyzer 170, a theme categorizer 180, and a music metadata database 190.

The music file database 110 records and maintains various music files played in the system for playing music 100. A mood of the various music files may be categorized as sad music, calm music, exciting music, strong music, and the like depending on emotional information which a human being feels, specifically, a mood of music. And the various music files may correspond to either a compressed file or a non-modified discrete cosine transform (non-MDCT)-based music file. As an example, the compressed file may be in a state where the music file is compressed depending on various compression methods in which MDCT coefficients may be extracted, e.g. a Moving Picture Experts Group Audio Layer 3 (MP3) method, an audio coding (AC)-3 method, an Ogg Vorbis method, and an advanced audio coding (AAC) method.

The determiner 120 determines a type of the music file, which is read and extracted from the music file database 110. Specifically, the determiner 120 determines whether the music file, which is read and extracted from the music file database 110, corresponds to either a compressed file or a non-MDCT-based music file. As an example, the determiner 120 may determine whether the music file, which is read and extracted from the music file database 110, corresponds to a compressed file of an MDCT method.

The music file processor 130 processes the music file depending on the type of the music file. Specifically, the music file processor 130 variously processes audio data of the music file depending on whether the music file corresponds to either a compressed file or a non-MDCT-based music file, as a result of the determining of the determiner 120. Hereinafter, configurations and operations of the music file processor 130 are described in detail with reference to FIG. 2.

Figure 2:
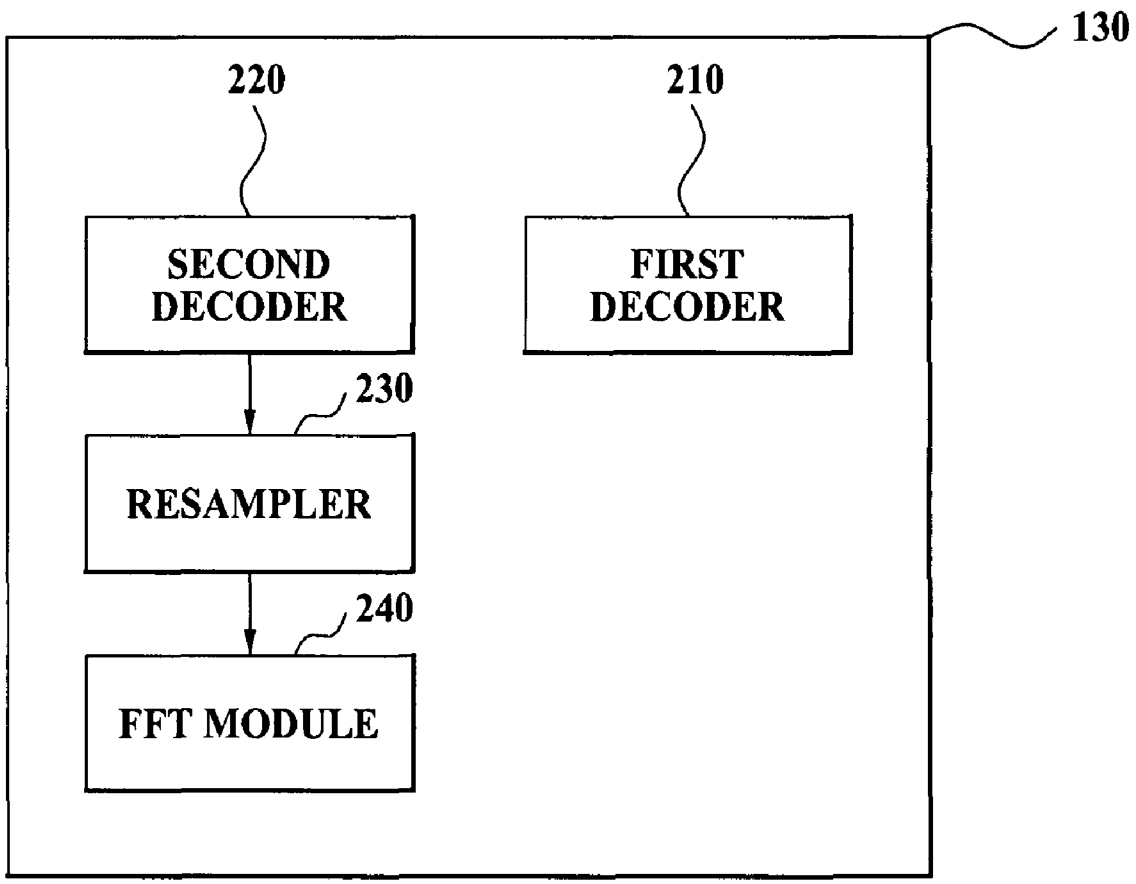
FIG. 2 is a diagram illustrating a configuration of a music file processor of FIG. 1.

FIG. 2 is a diagram illustrating a configuration of the music file processor 130 of FIG. 1.

Referring to FIG. 2, the music file processor 130 includes a first decoder 210, a second decoder 220, a resampler 230, and a fast Fourier transform (FFT) module 240.

The first decoder 210 partially decodes audio data of the compressed file when the determiner 120 determines that the music file corresponds to the compressed file. Specifically, the first decoder 210 extracts an MDCT coefficient from the compressed file by partially decoding audio data of the compressed file when the music file corresponds to the compressed file to which an MDCT compression method is applied.

The second decoder 220 fully decodes audio data of the non-compressed music file, when the determiner 120 determines that the music file corresponds to the non-MDCT-based music file. Specifically, the second decoder 220 fully decodes audio data of the non-compressed music file when the music file corresponds to the file of a non-MDCT compression method. As an example, the second decoder 220 may decode audio data of the music file in a non-compression zone, into pulse code modulation (PCM) data.

The resampler 230 resamples the fully-decoded audio data of the music file. Specifically, the resampler 230 may resample the fully-decoded audio data of the music file, for example, to 11.205 kHz.

The FFT module 240 performs FFT on the resampled audio data. As an example, the FFT module 240 may perform FFT on the audio data resampled to 11.205 kHz, with respect to 256 points every 20 ms units, thereby acquiring a 128-number of power spectral values for each frame.

As described above, the music file processor 130 may extract an MDCT coefficient by partial decoding, in the case of the music file using the MDCT compression method, as a result of the determiner 120 determining whether the music file corresponds to either a compressed file or a non-MDCT-based music file. Also, the music file processor 130 may process audio data of the non-MDCT-based music file as PCM data by full decoding, in the case of the music file of the non-MDCT compression method.

Specifically, the system for playing music 100 according to the present invention has, using the music file processor 130, a dual structure in which a process method with respect to audio data of a compressed file, and a process method with respect to audio data of a non-MDCT-based music file are different depending on whether a type of the music file corresponds to either a compressed file or a non-MDCT-based music file.

The mood categorizer 140 categorizes a mood of a music file. Specifically, the mood categorizer 140 analyzes the audio data of the music file processed by the music file processor 130, and categorizes a mood of the music file, for example, sad music, calm music, exciting music, strong music, and the like, depending on emotional information which a human being feels, specifically, a mood of the music file. Hereinafter, referring to FIG. 3, configurations and operations of the mood categorizer 140 are described in detail with reference to FIG. 3.

Figure 3:
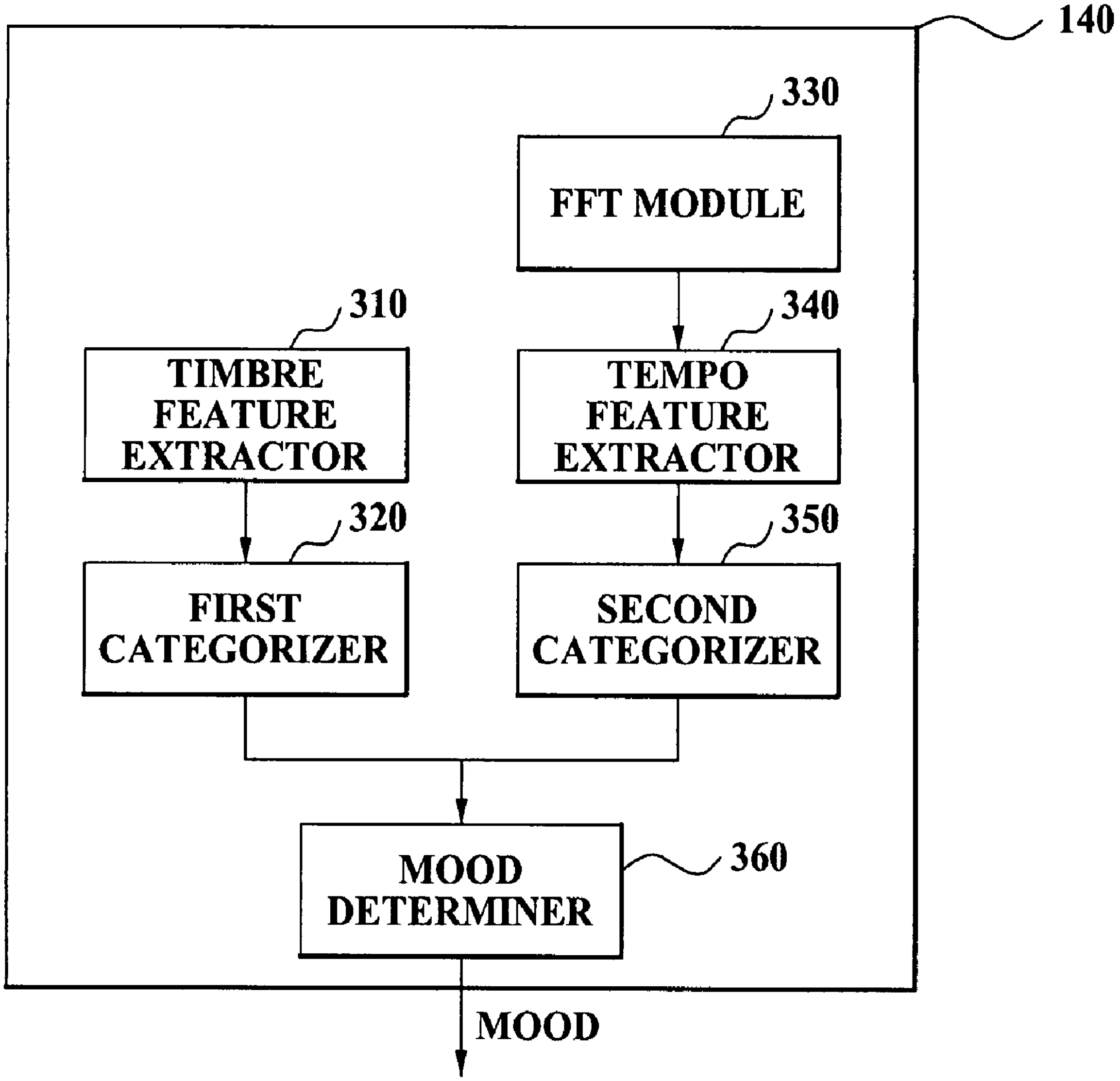
FIG. 3 is a diagram illustrating a configuration of a mood categorizer of FIG. 1.

FIG. 3 is a diagram illustrating a configuration of the mood categorizer 140 of FIG. 1.

Referring to FIG. 3, the mood categorizer 140 includes a timbre feature extractor 310, a first categorizer 320, an FFT module 330, a tempo feature extractor 340, a second categorizer 350, and a mood determiner 360.

The timbre feature extractor 310 extracts a timbre feature from the audio data of the music file processed by the music file processor 130, and the first categorizer 320 categorizes the music file depending on the timbre feature.

The FFT module 330 performs FFT on the audio data of the music file processed by the music file processor 130, and the tempo feature extractor 340 extracts a tempo feature from the audio data of the FFT-transformed music file, and the second categorizer 350 categorizes the music file depending on the tempo feature.

The mood determiner 360 determines a mood of the music file, combining a first categorization result of the first categorizer 320, with a second categorization result of the second categorizer 350.

As described above, the mood categorizer 140 may determine one final mood corresponding to the music file, combining the first categorization result categorized depending on the timbre feature after extracting the timbre feature from the audio data of the music file, with the second categorization result categorized depending on the tempo feature after extracting the tempo feature from the audio data of the music file.

Therefore, as an example, when the music file uses an MDCT compression method, the system for playing music 100 according to the present invention may perform a high-speed process by extracting an MDCT coefficient by partial decoding, and categorizing a mood of the music file, based on the extracted MDCT coefficient. As another example, when the music file uses a non-MDCT compression method, the system for playing music 100 according to the present invention may categorize a mood of the music file from PCM data by full decoding.

The similar music search module 150 searches for similar music having a mood similar to music which a user desires by referring to the categorized mood of the music file. Specifically, the similar music search module 150 extracts a similarity feature for searching for similar music, based on the timbre feature and the tempo feature extracted by the mood categorizer 140.

As described above, the similar music search module 150 may search for music in which a music feature of audio data corresponding to a mood similar to music which a user desires is similar, and recommend the similar music as a result of the searching for the similar music.

The highlight detector 160 detects a highlight section in which a feature of the music file may be best shown. Here, the highlight section may be changed by various definitions such as refrain sections of the music file, repetition sections, and the like. The definition of the highlight section is different for each user, and includes a greatly vague feature. Observing a feature of when the user first listens to predetermined music, content that is included in the corresponding music file is located by changing a listening to-portion while operating an apparatus for playing music rather than a starting portion of music.

Accordingly, since the highlight detector 160 intends to avoid boredom due to music being played from a starting portion of the music file rather than locating an important portion of the music file using the above-described feature, the highlight detector 160 analyzes audio data of the music file, categorizes the audio data of the music file into a specific frequency band, and detects a portion including the highest spectrum energy value, as a highlight section of the music file. Hereinafter, configurations and operations of the highlight detector 160 are described in detail with reference to FIG. 4.

Figure 4:
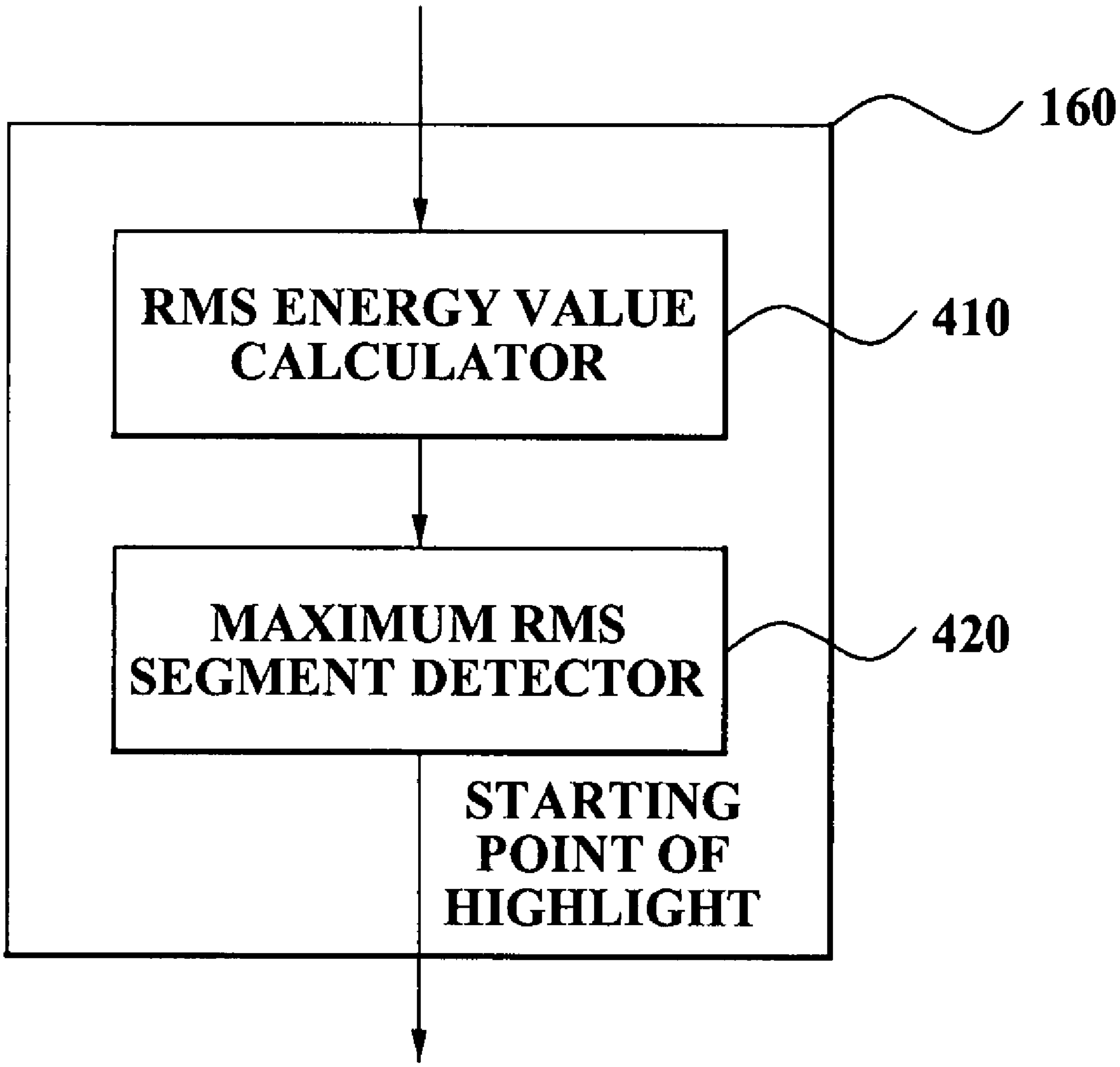
FIG. 4 is a diagram illustrating a configuration of a highlight detector of FIG. 1.

FIG. 4 is a diagram illustrating a configuration of the highlight detector 160 of FIG. 1.

Referring to FIG. 4, the highlight detector 160 includes a root mean square (RMS) energy value calculator 410 and a maximum RMS segment detector 420.

The RMS energy value calculator 410 calculates a subband RMS energy value of the music file. The RMS energy value calculator 410 calculates a subband RMS energy value of an MDCT-based spectrum of the music file, as illustrated in FIG. 6, when the music file corresponds to an MDCT compression method.

Figure 6:
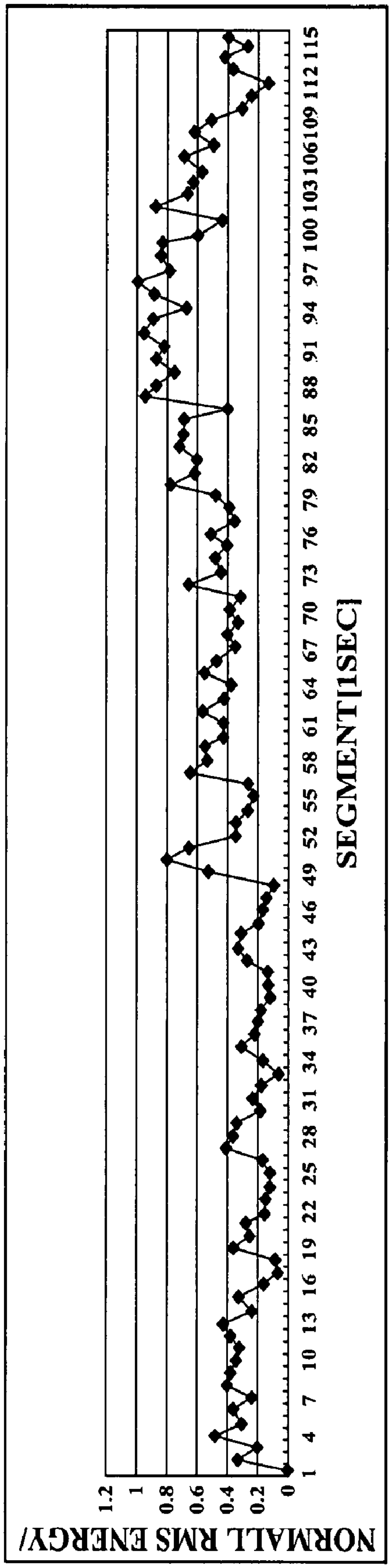
FIG. 6 is a diagram illustrating an example of subband root mean square (RMS) energy of a modified discrete cosine transform (MDCT)-based spectrum.

FIG. 6 is a diagram illustrating an example of subband root mean square (RMS) energy of a modified discrete cosine transform (MDCT)-based spectrum.

Referring to FIG. 6, the RMS energy value calculator 410 extracts an MDCT coefficient by partially decoding audio data of the compressed file, for example, when the music file corresponds to the compressed file, and calculates a spectrum RMS energy value using the MDCT coefficient, in a segment of one second units.

Figure 7:
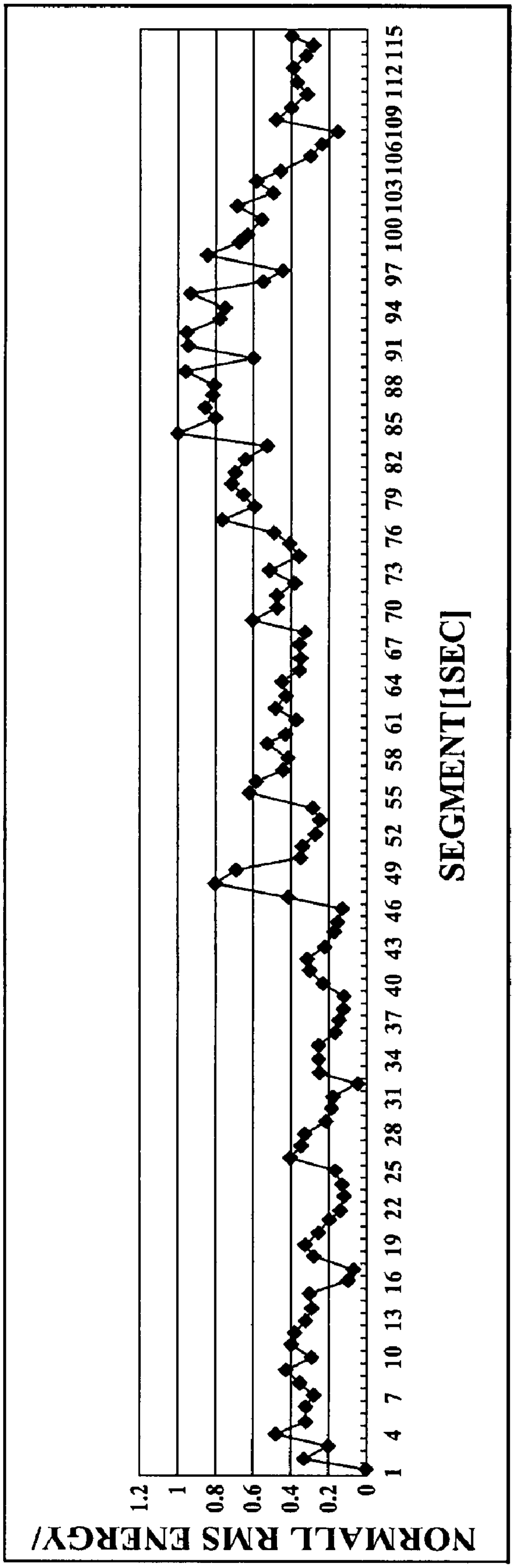
FIG. 7 is a diagram illustrating an example of subband RMS energy of a pulse code modulation (PCM)-based spectrum.

The RMS energy value calculator 410 calculates a subband RMS energy value of a PCM-based spectrum of the music file, as illustrated in FIG. 7, when the music file corresponds to a non-compression method.

FIG. 7 is a diagram illustrating an example of subband RMS energy of a PCM-based spectrum.

Referring to FIG. 7, the RMS energy value calculator 410 converts audio data into PCM data by fully decoding audio data of the non-MDCT-based music file, for example, when the music file corresponds to the non-MDCT-based music file, and converts a sampling frequency into 11.025 kHz. Subsequently the RMS energy value calculator 410 performs FFT for each frame of 23 ms units, and calculates an amplitude value of a spectrum. Also, the RMS energy value calculator 410 calculates an RMS energy value with respect to the amplitude values every segment of one second units, in a band ranging from 60 to 4000 Hz where dual voice exists.

The maximum RMS segment detector 420 detects a maximum RMS segment by referring to the calculated subband RMS energy value. Specifically, the maximum RMS segment detector 420 searches for a segment having a maximum RMS energy value from among all segments, as illustrated in FIGS. 6 and 7, and searches for a segment having a minimum RMS value again in a front five segments, specifically, a five second section, based on the segment. Also, the maximum RMS segment detector 420 detects the retrieved segment as a starting section of highlight of the music file.

As described above, the highlight detector 160 detects the segment having the minimum RMS value in the front five segments, as the starting section of highlight, based on the segment after searching for the segment having the maximum RMS energy value.

Therefore, the system for playing music 100 according to the present invention can play a highlight section of the music file depending on the starting section of highlight detected by the highlight detector 160, thereby reducing aversion which a user feels since music is played from a portion having a significantly great energy value.

Also, the system for playing music 100 according to the present invention can provide a music summarization function which summarizes a feature of the music file.

The title analyzer 170 analyzes a title of the music file recorded in the music file database 110. The title analyzer 170 may be separately embodied from the theme categorizer 180, as illustrated in FIG. 1, or be included in the theme categorizer 180.

The theme categorizer 180 acquires music title information of the music file, and categorizes a theme of the music file, based on text analysis from the music title information.

Figure 5:
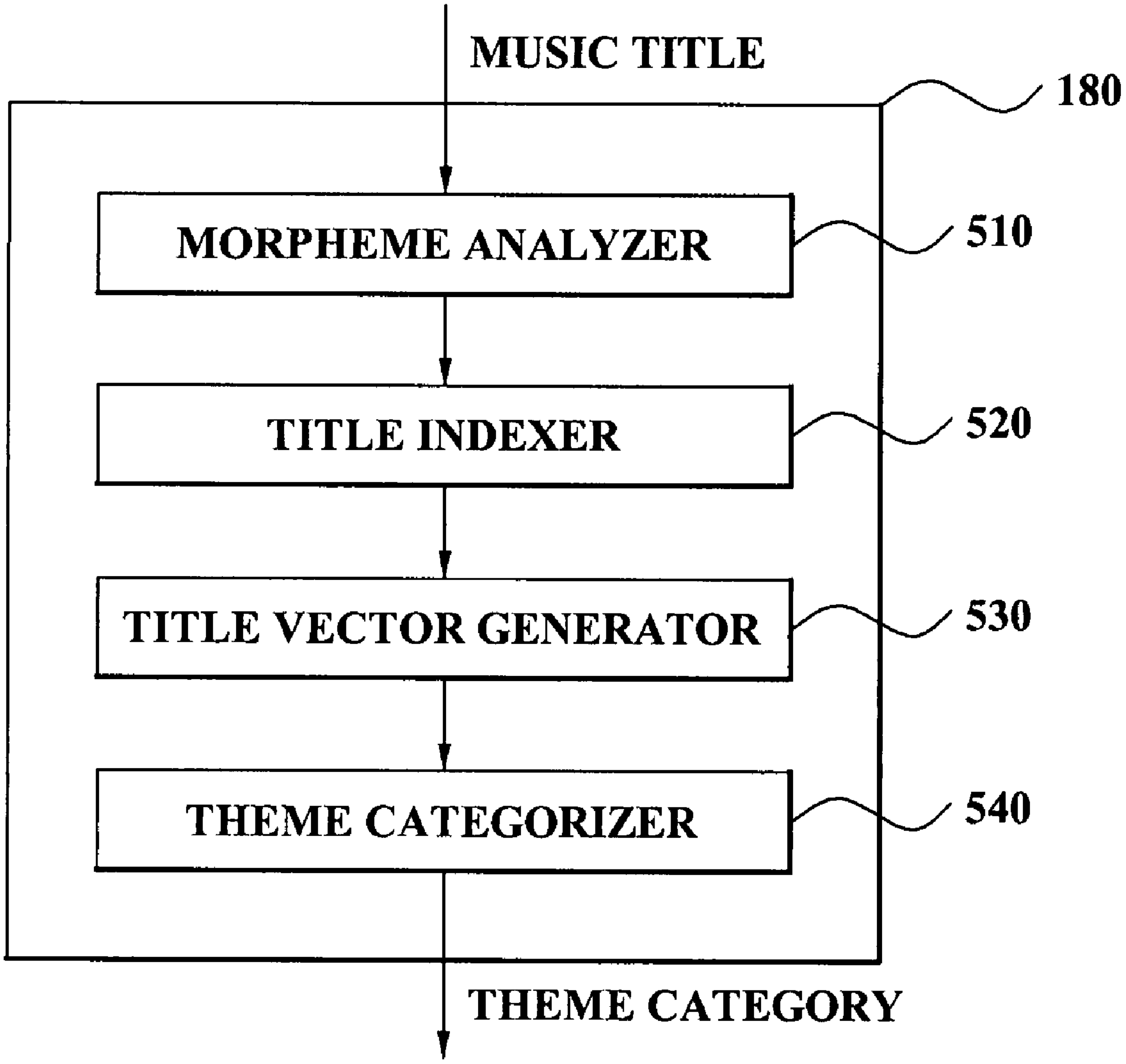
FIG. 5 is a diagram illustrating a configuration of a theme categorizer of FIG. 1.

FIG. 5 is a diagram illustrating a configuration of a theme categorizer of FIG. 1.

Referring to FIG. 5, the theme categorizer 180 includes a morpheme analyzer 510, a title indexer 520, a title vector generator 530, and a theme categorizer 540. The theme categorizer 180 may be separately configured from the title analyzer 170, or include the title analyzer 170.

The morpheme analyzer 510 analyzes the music title of the music file depending on each morpheme, and the title indexer 520 indexes the title of the analyzed music file, and the title vector generator 530 generates a title vector of the indexed music file, and the theme categorizer 540 categorizes a theme of the music file by analyzing the theme vector.

As described above, the theme categorizer 180 may categorize a theme of the music file by text analysis from the music title information of the music file which is recorded in the music file database 110 and is analyzed by the title analyzer 170.

The music metadata database 190 records and maintains a similarity feature extracted from the similar music search module 150, mood information of the music file categorized by the mood categorizer 140, starting point information of highlight detected by the highlight detector 160, and theme category information categorized by the theme categorizer 180. Specifically, the music metadata database 190 stores metadata related to the music file such as the similarity feature, the mood information, the starting point information of the highlight, and the theme category information without storing the music file as such, different from the music file database 110.

Therefore, the system for playing music 100 according to the present invention can analyze a music file recorded in the music file database 110, categorize a mood of the music file, extract a similarity feature for searching for similar music, detect a highlight section, and categorize a theme of music from a music title.

Also, the system for playing music 100 according to the present invention has an advantage that a user easily can listen to music suitable for a state since a more efficient music selection method is provided than a conventional simple method of playing music.

Also, the system for playing music 100 according to the present invention has an advantage that a high-speed process is possible in a compression zone, as a dual structure, specifically, a compression/non-compression zone process, and a process is possible in various music file formats due to the non-compression zone process.

Figure 8:
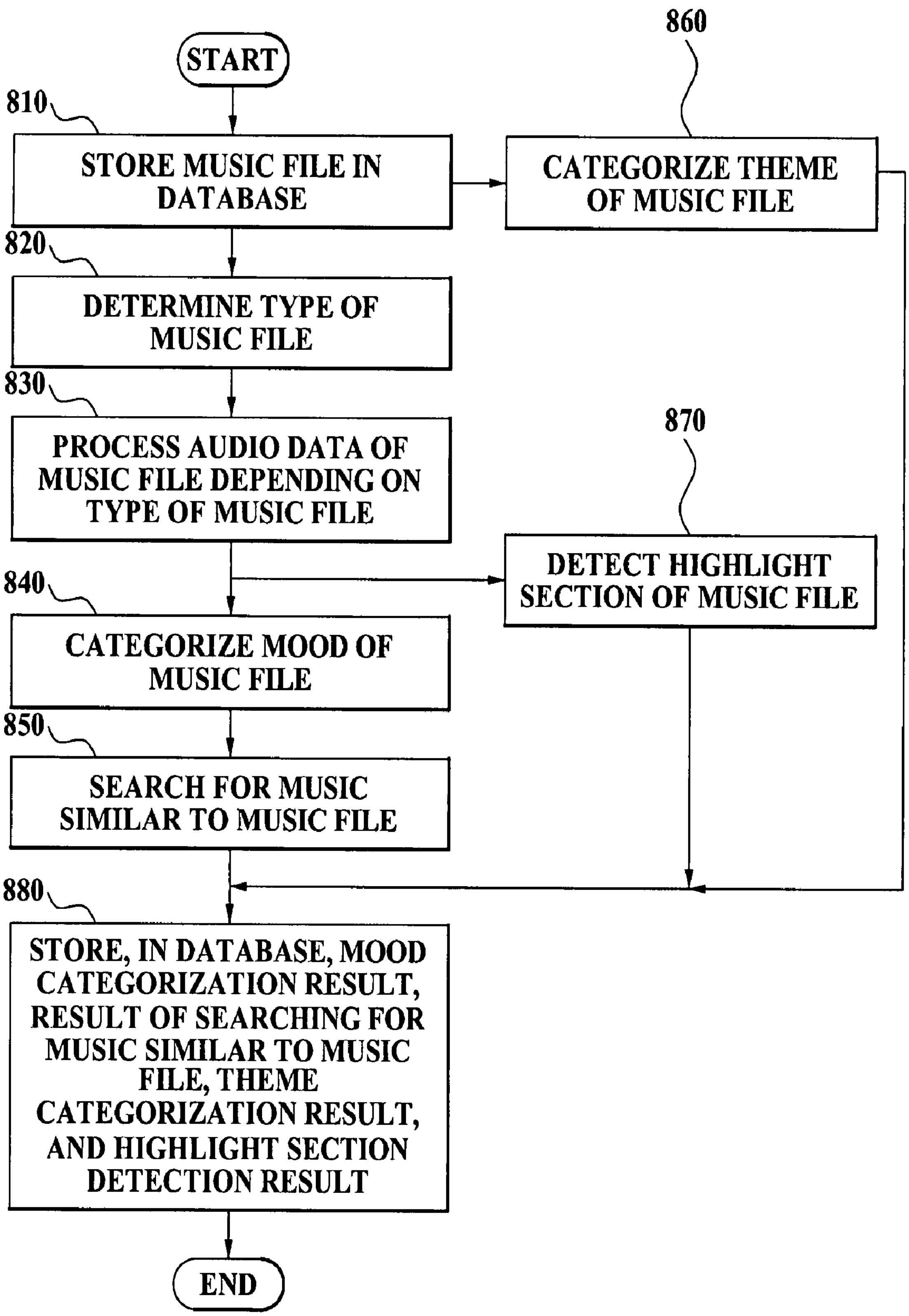
FIG. 8 is a flowchart illustrating a method of playing music according to an exemplary embodiment of the present invention.

FIG. 8 is a flowchart illustrating a method of playing music according to an exemplary embodiment of the present invention.

Referring to FIG. 8, the system for playing music stores a music file in a database, in operation 810. Specifically, the system for playing music records and maintains various music files to which a user can listen.

In operation 820, the system for playing music determines a type of the music file. Specifically, the system for playing music determines whether the music file corresponds to either a compressed file or a non-MDCT-based music file, in operation 820.

In operation 830, the system for playing music processes audio data of the music file depending on the type of the music file. As an example, the system for playing music fully decodes audio data of the non-MDCT-based music file when the music file corresponds to the non-MDCT-based music file, resamples the fully-decoded audio data, and performs FFT on the resampled audio data. As another example, the system for playing music partially decodes audio data of the compressed file when the music file corresponds to the compressed file.

As described above, a method of playing music according to the present invention can extract an MDCT coefficient by partial decoding, in the case of the music file using the MDCT compression method, as a result of determining whether the music file corresponds to either a compressed file or a non-MDCT-based music file. Also, the method of playing music according to the present invention can process audio data of the non-MDCT-based music file as PCM data by full decoding, in the case of the music file of the non-MDCT compression method.

Specifically, the method of playing music according to the present invention has a dual structure in which a process method with respect to audio data of a compressed file, and a process method with respect to audio data of a non-MDCT-based music file are different depending on whether a type of the music file corresponds to either a compressed file or a non-MDCT-based music file.

Therefore, the method of playing music according to the present invention has an advantage that a high-speed process is possible in a compression zone, as a dual structure, specifically, a compression/non-compression zone process, and a process is possible in various music file formats due to the non-compression zone process.

In operation 840, the system for playing music categorizes a mood of the music file. Hereinafter, a method of categorizing a mood of the music file in the system for playing music is described in detail with reference to FIG. 9.

Figure 9:
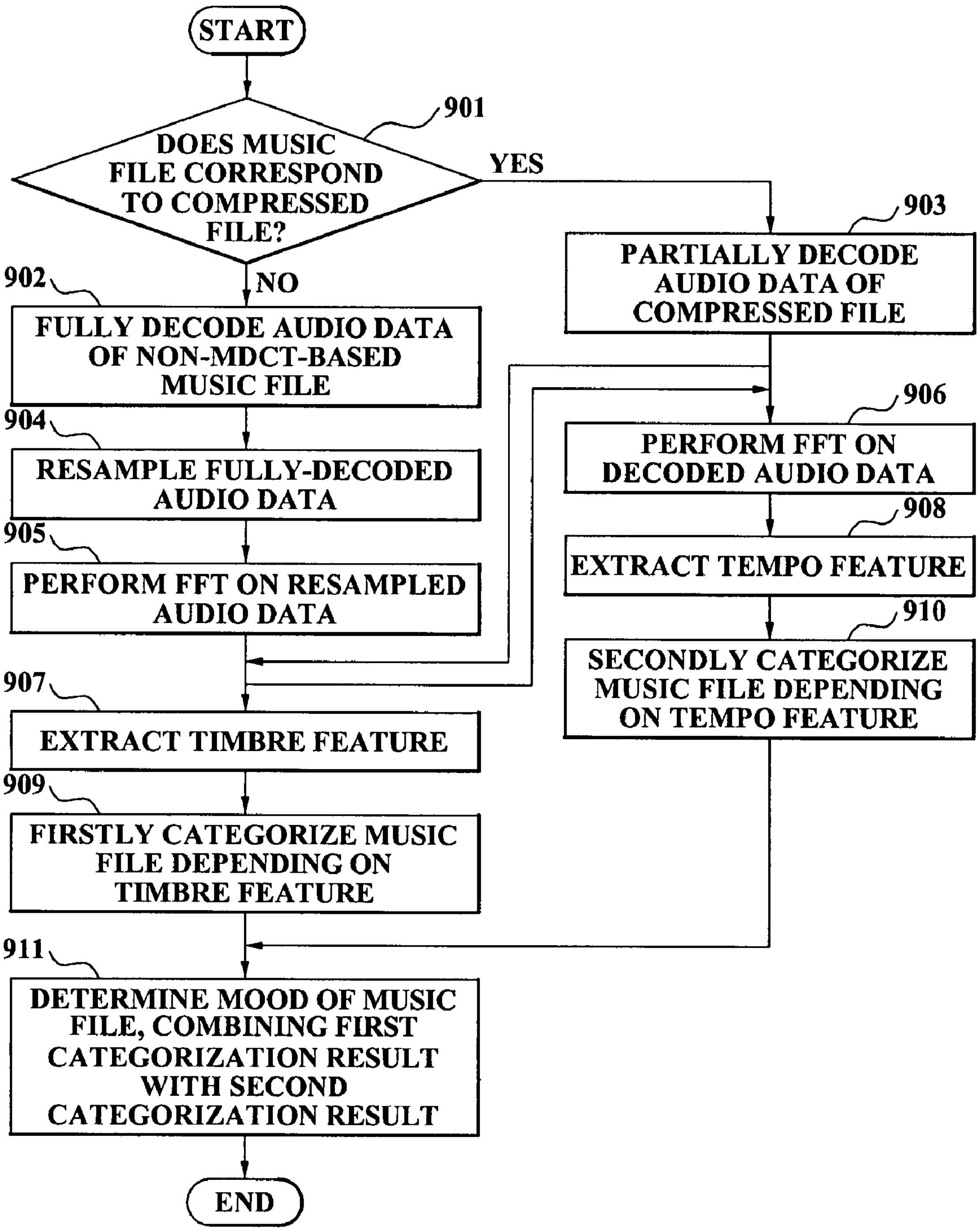
FIG. 9 is a flowchart illustrating a process of categorizing a mood of a music file depending on a type of the music file, in a method of playing music according to an exemplary embodiment of the present invention.

FIG. 9 is a flowchart illustrating a process of categorizing a mood of a music file depending on a type of the music file, in a method of playing music according to an exemplary embodiment of the present invention.

Referring to FIG. 9, the system for playing music determines whether the music file corresponds to either a compressed file or a non-MDCT-based music file, in operation 901.

In operation 902, the system for playing music fully decodes audio data of the non-MDCT-based music file when the music file corresponds to a non-compressed file, specifically, the non-MDCT-based music file. Specifically, in operation 902, the system for playing music may decode audio data of the non-MDCT-based music file into, for example, PCM data.

In operation 903, the system for playing music partially decodes audio data of the compressed file when the music file corresponds to the compressed file. Specifically, the system for playing music may extract an MDCT coeffiecient by partially decoding audio data of the compressed file, in operation 903.

In operation 904, the system for playing music resamples the fully-decoded audio data. The system for playing music may resample the fully-decoded audio data of the music file, for example, to 11.205 kHz.

In operation 905, the system for playing music performs FFT on the resampled audio data. As an example, the system for playing music may perform FFT on the audio data resampled to 11.205 kHz, with respect to 256 points every 20 ms units, thereby acquiring a 128-number of power spectral values for each frame. In operation 906, the system for playing music performs FFT on the fully-decoded audio data.

In operation 907, the system for playing music extracts a timbre feature from the audio data which is FFT-transformed in operation 905, and in operation 908, the system for playing music extracts a tempo feature from the audio data which is FFT-transformed in operation 906.

In operation 909, the system for playing music firstly categorizes the music file depending on the timbre feature, and in operation 910, the system for playing music secondly categorizes the music file depending on the tempo feature.

In operation 911, the system for playing music determines a mood of the music file, combining a first categorization result with a second categorization result.

As described above, a method of playing music according to the present invention can determine one final mood corresponding to the music file, combining the first categorization result categorized depending on the timbre feature after extracting the timbre feature from the audio data of the music file, with the second categorization result categorized depending on the tempo feature after extracting the tempo feature from the audio data of the music file.

In operation 850, the system for playing music searches for music similar to the music file. Specifically, the system for playing music extracts a similarity feature for searching for music similar to the music file. Hereinafter, a process of searching for music similar to the music file, in the system for playing music according to the present invention is described in detail with reference to FIG. 10.

Figure 10:
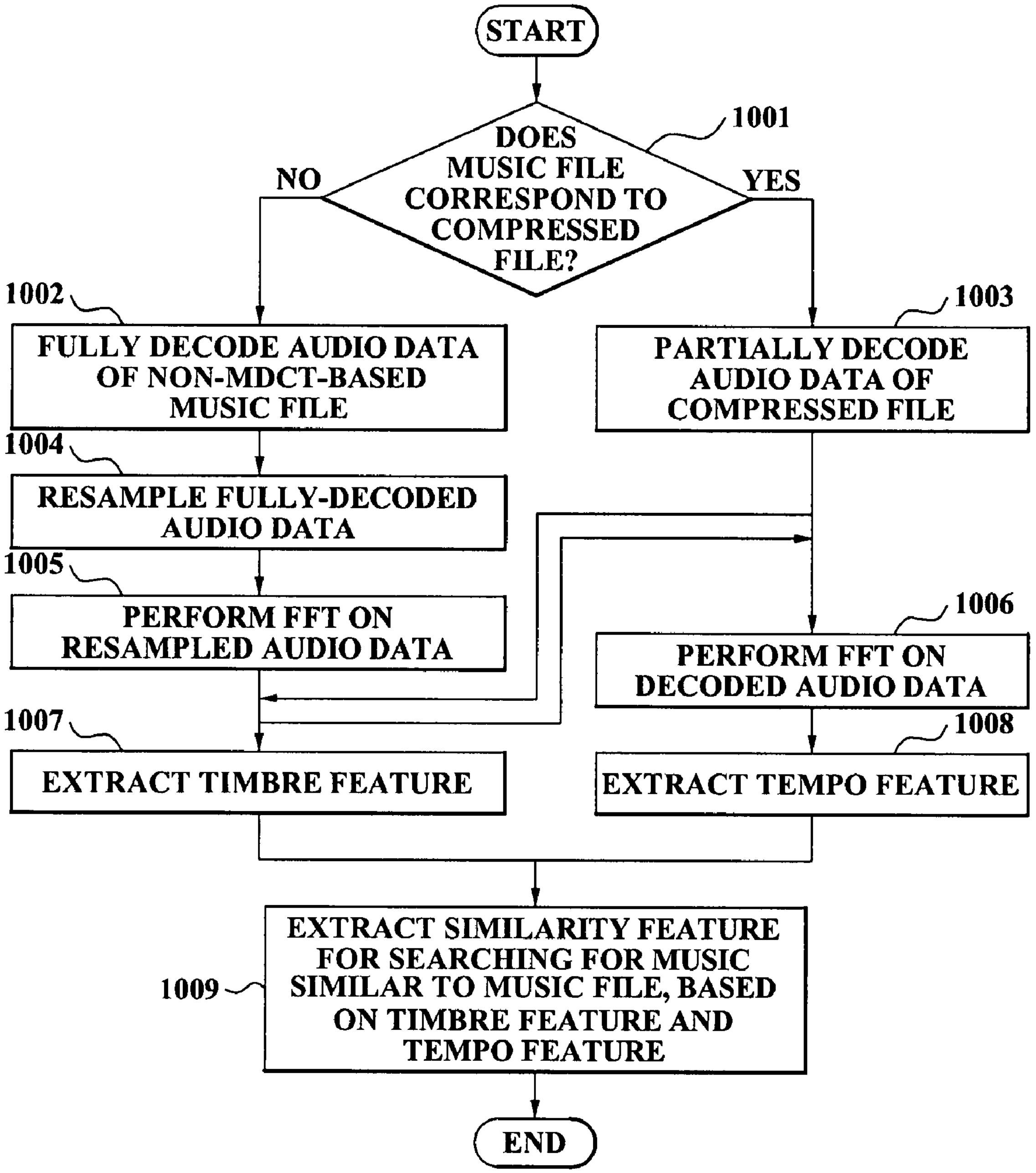
FIG. 10 is a flowchart illustrating a process of extracting a feature for searching for music similar to a music file depending on a type of the music file, in a method of playing music according to an exemplary embodiment of the present invention.

FIG. 10 is a flowchart illustrating a process of extracting a feature for searching for music similar to a music file depending on a type of the music file, in a method of playing music according to another exemplary embodiment of the present invention.

In operation 1001, the system for playing music determines whether the music file corresponds to either a compressed file or a non-MDCT-based music file.

In operation 1002, the system for playing music fully decodes audio data of the non-MDCT-based music file when the music file corresponds to a non-compressed file, specifically, the non-MDCT-based music file. Specifically, in operation 1002, the system for playing music may decode audio data of the non-MDCT-based music file into, for example, PCM data.

In operation 1003, the system for playing music partially decodes audio data of the compressed file when the music file corresponds to the compressed file. Specifically, the system for playing music may extract an MDCT coeffiecient by partially decoding audio data of the compressed file, in operation 1003.

In operation 1004, the system for playing music resamples the fully-decoded audio data. The system for playing music may resample the fully-decoded audio data of the music file, for example, to 11.205 kHz.

In operation 1005, the system for playing music performs FFT on the resampled audio data. As an example, the system for playing music may perform FFT on the audio data resampled to 11.205 kHz, with respect to 256 points every 20 ms units, thereby acquiring a 128-number of power spectral values for each frame. In operation 1006, the system for playing music performs FFT on the fully-decoded audio data.

In operation 1007, the system for playing music extracts a timbre feature from the audio data which is FFT-transformed in operation 1005, and in operation 1008, the system for playing music extracts a tempo feature from the audio data which is FFT-transformed in operation 1006.

In operation 1009, the system for playing music extracts a similarity feature for the searching for music similar to the music file, based on the timbre feature and the tempo feature.

As described above, the system for playing music may respectively process audio data of the music file depending on whether the music file corresponds to either a compressed file or a non-MDCT-based music file, search for music in which a music feature of audio data corresponding to a mood similar to music which a user desires is similar by using the timbre feature and the tempo feature extracted from the audio data of the processed music file, and recommend the similar music as a result of the searching for the similar music.

In operation 860, the system for playing music categorizes a theme of the music file. Hereinafter, a process of categorizing a theme of the music file, in the system for playing music according to the present invention is described in detail with reference to FIG. 12.

Figure 12:
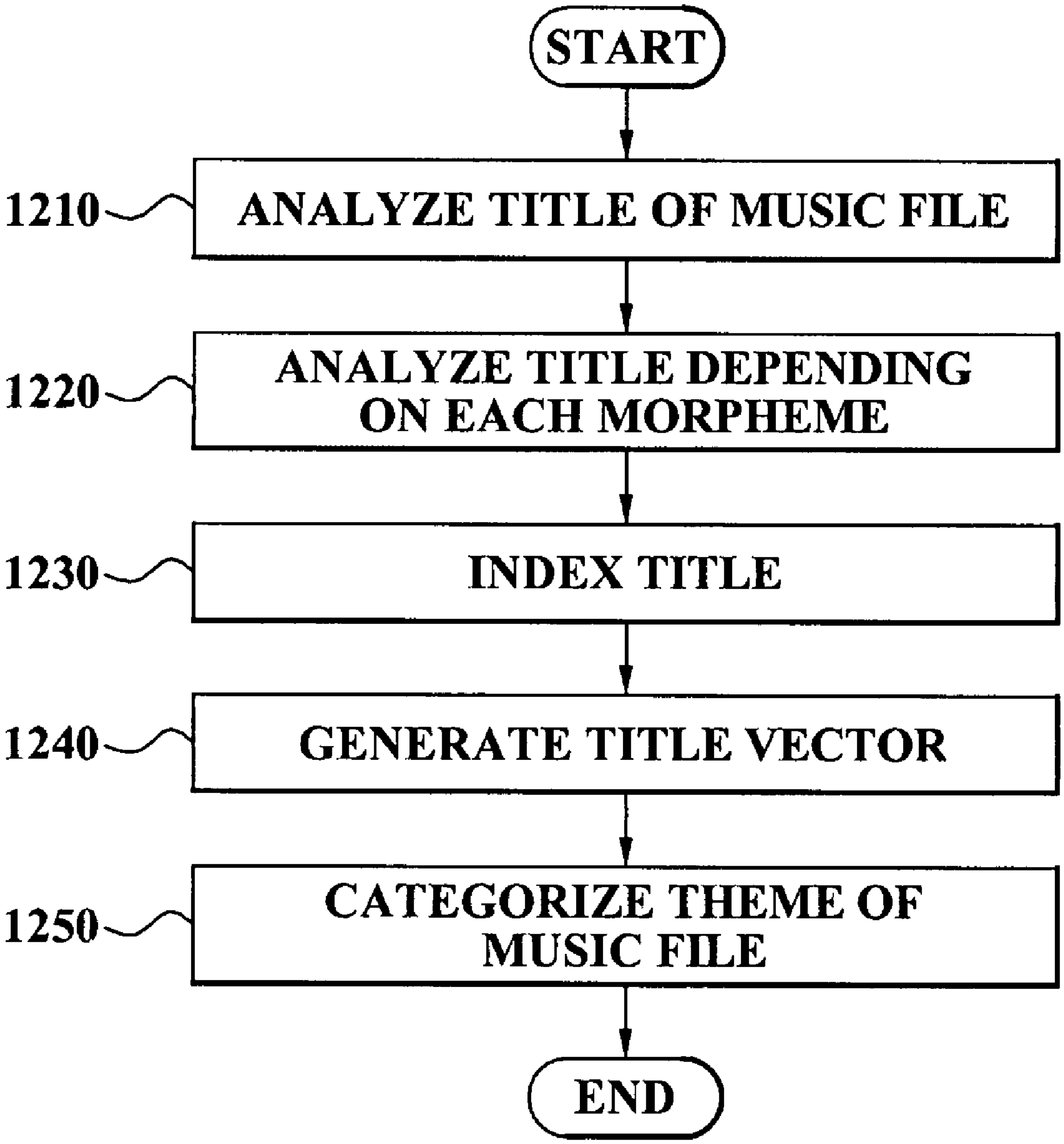
FIG. 12 is a flowchart illustrating a process of categorizing a theme of a music file, in a method of playing music according to another exemplary embodiment of the present invention.

FIG. 12 is a flowchart illustrating a process of categorizing a theme of a music file, in a method of playing music according to an exemplary embodiment of the present invention.

Referring to FIG. 12, the system for playing music analyzes a title of the music file, in operation 1210. As an example, the system for playing music may analyze a title of the music file by using title information included in the music file.

In operation 1220, the system for playing music analyzes the analyzed title of the music file depending on each morpheme, and in operation 1230, the system for playing music indexes the title of the music file.

In operation 1240, the system for playing music generates a title vector of the indexed music file, and in operation 1250, the system for playing music categorizes a theme of the music file, based on the theme vector.

In operation 870, the system for playing music detects a highlight section of the music file. Hereinafter, a process of detecting a highlight section of the music file depending on whether the music file corresponds to either a compressed file or a non-MDCT-based music file, in the system for playing music according to the present invention is described in detail with reference to FIG. 11.

Figure 11:
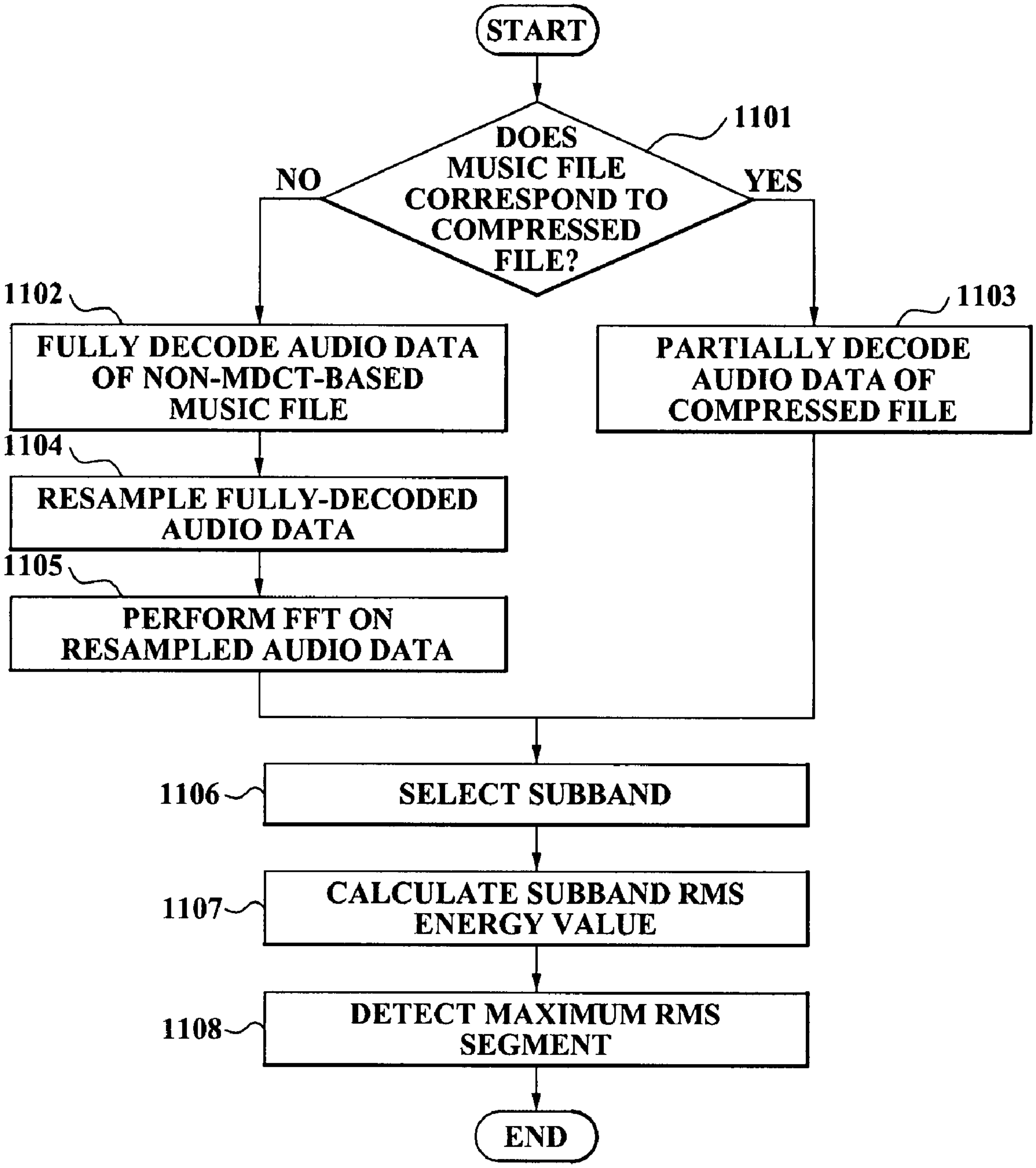
FIG. 11 is a flowchart illustrating a process of detecting a highlight section of a music file depending on a type of the music file, in a method of playing music according to an exemplary embodiment of the present invention.

FIG. 11 is a flowchart illustrating a process of detecting a highlight section of a music file depending on a type of the music file, in a method of playing music according to an exemplary embodiment of the present invention.

Referring to FIG. 11, in operation 1101, the system for playing music determines whether the music file corresponds to either a compressed file or a non-MDCT-based music file.

In operation 1102, the system for playing music fully decodes audio data of the non-MDCT-based music file when the music file corresponds to a non-compressed file, specifically, the non-MDCT-based music file. Specifically, in operation 1102, the system for playing music may decode audio data of the non-MDCT-based music file into, for example, PCM data.

In operation 1103, the system for playing music partially decodes audio data of the compressed file when the music file corresponds to the compressed file. Specifically, the system for playing music may extract an MDCT coeffiecient by partially decoding audio data of the compressed file, in operation 1103.

In operation 1104, the system for playing music resamples the fully-decoded audio data of the music file. The system for playing music may resample the fully-decoded audio data of the music file, for example, to 11.205 kHz.

In operation 1105, the system for playing music performs FFT on the resampled audio data. As an example, the system for playing music may perform FFT on the audio data resampled to 11.205 kHz, with respect to 256 points every 20 ms units, thereby acquiring a 128-number of power spectral values for each frame.

In operation 1106, the system for playing music selects a subband from the FFT-transformed audio data.

In operation 1107, the system for playing music calculates an RMS energy value of the selected subband. As an example, the system for playing music converts audio data into PCM data by fully decoding audio data of the non-MDCT-based music file, for example, when the music file corresponds to the non-MDCT-based music file, and converts a sampling frequency into 11.025 kHz, in operation 1107. Subsequently, the system for playing music performs FFT for each frame of 23 ms units, and calculates an amplitude value of a spectrum, and calculates an RMS energy value with respect to the amplitude values every segment of one second units, in a band ranging from 60 to 4000 Hz where dual voice exists, in operation 1107. As another example, the system for playing music extracts an MDCT coefficient by partially decoding audio data of the compressed file, for example, when the music file corresponds to the compressed file, and calculates a spectrum RMS energy value using the MDCT coefficient, in a segment of one second units, in operation 1107.

In operation 1108, the system for playing music detects a maximum RMS segment by referring to the calculated sub-band RMS energy value. Specifically, the system for playing music searches for a segment having a maximum RMS energy value from among all segments, as illustrated in FIGS. 6 and 7, and searches for a segment having a minimum RMS value again in a front five segments, specifically, a five seconds section, based on the segment, in operation 1108. Also, the system for playing music detects the retrieved segment as a starting section of highlight of the music file, in operation 1108.

As described above, the method of playing music according to the present invention detects the segment having the minimum RMS value in the front five segments, as the starting section of highlight, based on the segment after searching for the segment having the maximum RMS energy value.

Therefore, the method of playing music according to the present invention can play a highlight section of the music file depending on the detected starting section of highlight, thereby reducing aversion which a user feels since music is played from a portion having a significantly great energy value.

Also, the method of playing music according to the present invention can provide a music summarization function which summarizes a feature of the music file.

In operation 880, the system for playing music stores, in database, a mood categorization result, a result of searching for music similar to music file, a theme categorization result, and a highlight section detection result.

Therefore, the method of playing music according to the present invention can analyze a music file, categorize a mood of the music file, extract a similarity feature for searching for similar music, detect a highlight section, and categorize a theme of music from a music title.

The method of playing music according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

A system and method of playing music according to the above-described exemplary embodiments of the present invention may provide a function of categorizing a mood of a music file, detecting a highlight of the music file, searching for similar music to the music file, and categorizing a theme of the music file.

Also, a system and method of playing music according to the above-described exemplary embodiments of the present invention may selectively play music suitable for a user's situation.

Also, a system and method of playing music according to the above-described exemplary embodiments of the present invention may perform a high-speed process in a compression zone since a music file is processed by a dual structure of a compression zone and a non-compression zone, and perform a process in various music file formats due to a non-compression zone process.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for playing music, the system comprising:

a determiner determining a type of a music file;

a music file processor processing audio data of the music file depending on the type of the music file;

a mood categorizer categorizing a mood of the processed music file; and a similar music search module searching for similar music having a mood similar to music which a user desires by referring to the categorized mood, wherein the determiner determines whether the music file corresponds to either a compressed file or a non-modified discrete cosine transform (non-MDCT)-based music file, wherein the music file processor comprises:

a first decoder partially decoding audio data of the compressed file when the music file corresponds to the compressed file;

a second decoder fully decoding audio data of the non-MDCT-based music file when the music file corresponds to the non-MDCT-based music file;

a resampler resampling the audio data decoded in the second decoder; and a fast Fourier transform (FFT) module performing FFT on the resampled audio data.

2. The system of claim 1, further comprising:

a highlight detector detecting a highlight section of the music file; and a theme categorizer categorizing a theme of the music file.

3. The system of claim 2, wherein the highlight detector comprises:

a root mean square (RMS) energy value calculator calculating a subband RMS energy value of the music file; and a maximum RMS segment detector detecting a maximum RMS segment from the calculated subband RMS energy value.

4. The system of claim 2, wherein the theme categorizer comprises:

a title analyzer analyzing a title of the music file;

a morpheme analyzer analyzing the analyzed title of the music file depending on each morpheme;

a title indexer indexing the title of the music file;

a title vector generator generating a title vector of the indexed music file; and a theme categorizer categorizing a theme of the music file by analyzing the theme vector.

5. The system of claim 1, wherein the mood categorizer comprises:

a timbre feature extractor extracting a timbre feature from the audio data of the music file processed by the music file processor;

a first categorizer categorizing the music file depending on the timbre feature;

an FFT module performing FFT on the audio data of the music file processed by the music file processor;

a tempo feature extractor extracting a tempo feature from the audio data of the FFT-transformed music file;

a second categorizer categorizing the music file depending on the tempo feature; and a mood determiner determining a mood of the music file, based on a first categorization result of the first categorizer, and a second categorization result of the second categorizer.

6. A method of playing music, the method comprising:

determining a type of a music file;

processing audio data of the music file depending on the type of the music file;

categorizing a mood of the processed music file; and searching for music similar to the music file, based on the mood, wherein the determining of the type of the music file determines whether the music file corresponds to either a compressed file or a non-MDCT-based music file, wherein the processing of the audio data of the music file comprises:

fully decoding audio data of the non-MDCT-based music file when the music file corresponds to the non-MDCT-based music file;

partially decoding audio data of the compressed file when the music file corresponds to the compressed file;

resampling the fully-decoded audio data; and performing FFT on the resampled audio data.

7. The method of claim 6, further comprising:

detecting a highlight section of the music file; and categorizing a theme of the music file.

8. The method of claim 7, wherein the categorizing of the mood of the music file comprises:

extracting a timbre feature from the processed audio data of the music file;

first categorizing the music file depending on the timbre feature;

performing FFT on the processed audio data of the music file;

extracting a tempo feature from the audio data of the FFT-transformed music file;

second categorizing the music file depending on the tempo feature; and determining a mood of the music file, based on a result of the first categorization and a result of the second categorization.

9. The method of claim 7, wherein the detecting of the highlight section of the music file comprises:

calculating a subband RMS energy value of the music file; and detecting a maximum RMS segment from the calculated subband RMS energy value.

10. The method of claim 6, wherein the searching for music similar to the music file comprises:

extracting a timbre feature from the processed audio data of the music file;

performing FFT on the processed audio data of the music file;

extracting a tempo feature from the audio data of the FFT-transformed music file;

extracting a similarity feature for the searching for music similar to the music file, based on the timbre feature and the tempo feature.

11. The method of claim 6, wherein the categorizing of the theme of the music file comprises:

analyzing a title of the music file;

analyzing the analyzed title of the music file depending on each morpheme;

indexing the title of the music file;

generating a title vector of the indexed music file; and categorizing a theme of the music file by analyzing the theme vector.

12. At least one medium comprising computer readable instructions implementing a method of playing music, the method comprising:

determining a type of a music file;

processing audio data of the music file depending on the type of the music file;

categorizing a mood of the processed music file; and searching for music similar to the music file, based on the mood, wherein the determining of the type of the music file determines whether the music file corresponds to either a compressed file or a non-MDCT-based music file, wherein the processing of the audio data of the music file comprises:

fully decoding audio data of the non-MDCT-based music file when the music file corresponds to the non-MDCT-based music file;

partially decoding audio data of the compressed file when the music corresponds to the compressed file;

resampling the fully-decoded audio data; and performing FFT on the resampled audio data.

* * * * *